United States Patent
Liu et al.

(10) Patent No.: US 9,759,811 B2
(45) Date of Patent: Sep. 12, 2017

(54) RADAR VEHICLE TRACKING

(71) Applicant: Honeywell International Inc., Morristown, NJ (US)

(72) Inventors: Haiyang Liu, Plymouth, MN (US); Xiao Liu, Austin, TX (US)

(73) Assignee: Honeywell International Inc., Morris Plains, NJ (US)

(*) Notice: Subject to any disclaimer, the term of this patent is extended or adjusted under 35 U.S.C. 154(b) by 340 days.

(21) Appl. No.: 14/563,669

(22) Filed: Dec. 8, 2014

(65) Prior Publication Data
US 2016/0161605 A1    Jun. 9, 2016

(51) Int. Cl.
*G01S 13/66* (2006.01)
*G01S 13/00* (2006.01)
*G01S 13/87* (2006.01)
*G01S 13/72* (2006.01)
*G01S 13/91* (2006.01)

(52) U.S. Cl.
CPC .......... *G01S 13/66* (2013.01); *G01S 13/003* (2013.01); *G01S 13/878* (2013.01); *G01S 13/723* (2013.01); *G01S 13/91* (2013.01)

(58) Field of Classification Search
CPC ...... G01S 13/66; G01S 13/878; G01S 13/003; G01S 13/723; G01S 13/91
USPC ............. 342/59, 70–72, 125–127, 133, 139, 342/146–147
See application file for complete search history.

(56) References Cited

U.S. PATENT DOCUMENTS

| | | |
|---|---|---|
| 6,545,633 B1 | 4/2003 | Jensen |
| 2004/0135718 A1 | 7/2004 | Herberthson |
| 2004/0189514 A1 | 9/2004 | Schlick et al. |
| 2007/0176822 A1 | 8/2007 | Shirakawa |
| 2008/0165046 A1 | 7/2008 | Fullerton et al. |
| 2014/0347209 A1* | 11/2014 | Harda .................. G01S 13/06 342/146 |

OTHER PUBLICATIONS

Extended Search Report from related EP Patent Application 15195746, dated May 11, 2016, 7 pp.

* cited by examiner

*Primary Examiner* — John B Sotomayor
(74) *Attorney, Agent, or Firm* — Brooks, Cameron & Huebsch, PLLC

(57) ABSTRACT

Radar vehicle tracking is described. One or more embodiments include a device to receive a first determined distance between a first radar transceiver and a vehicle, the first distance determined by the first radar transceiver operating in a first mode, receive a second determined distance between a second radar transceiver and the vehicle, the second distance determined by the second radar transceiver operating in the first mode, receive a first determined distance ellipse between the first radar transceiver and the vehicle, the first distance ellipse determined by the first radar transceiver operating in a second mode, receive a second determined distance ellipse between the second radar transceiver and the vehicle, the second distance ellipse determined by the second radar transceiver operating in the second mode, and determine at least one location estimate of the vehicle based on the first and second determined distances and first and second determined distance ellipses.

18 Claims, 6 Drawing Sheets

RADAR VEHICLE TRACKING

STATEMENT OF GOVERNMENT RIGHTS

The subject matter of this disclosure was made with government support under the Government Program Intention Aware Vehicle Tracking & Traffic Management System (IAVTS) under Contract No.: DTFH61-14-C-00004. Accordingly, the U.S. Government has certain rights to subject matter disclosed herein.

TECHNICAL FIELD

The present disclosure relates to radar vehicle tracking.

BACKGROUND

Radar involves the use of waves (e.g., radio waves, microwaves, etc.) to determine range, direction, and/or speed of objects. Radar can be implemented through the use of a transmitter that sends a wave and a receiver that receives the wave after it has been reflected off of an object. In some cases, a transmitter and a receiver can be implemented on a single device called a transceiver.

Multiple transmitters, receivers, and/or transceivers can be implemented as a radar system. Though increasing the number of devices used may decrease errors, the increase may come at a cost. More devices can result in increased acquisition costs, installation costs, operation costs, and/or maintenance costs, among others.

DETAILED DESCRIPTION

Figure 1:
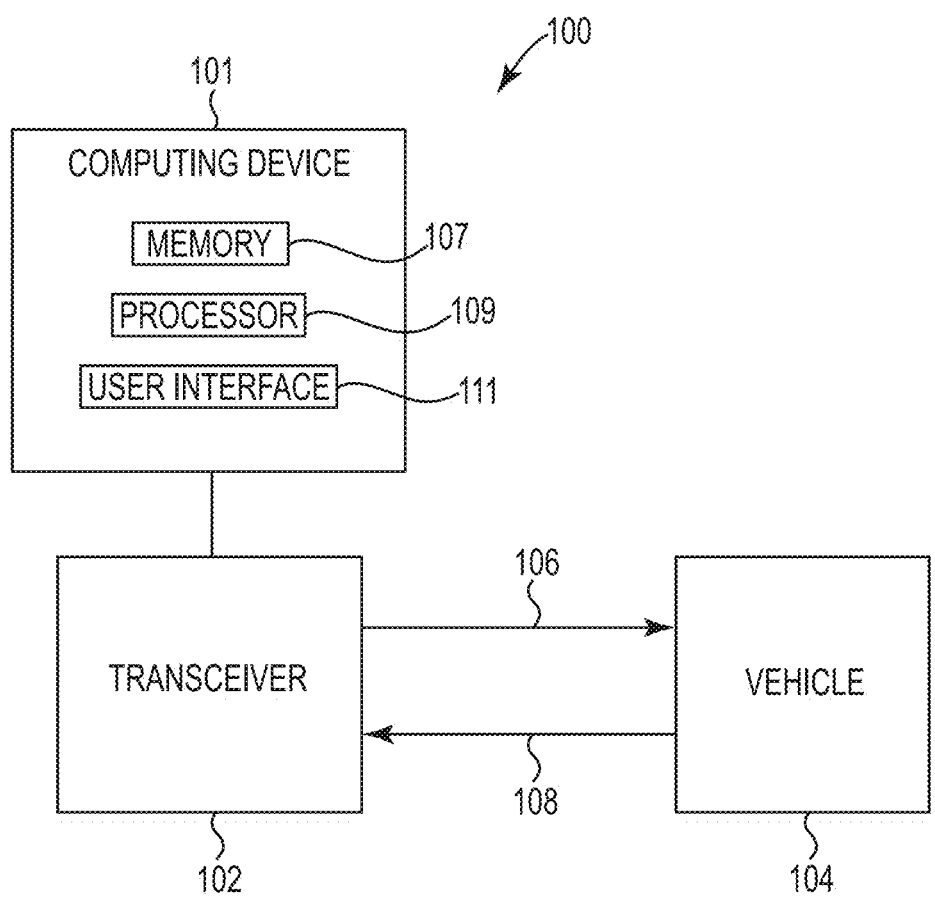
FIG. 1 illustrates a system for radar vehicle tracking in accordance with one or more embodiments of the present disclosure.

Radar vehicle tracking is described herein. For example, one or more embodiments include a device to receive a first determined distance between a first radar transceiver and a vehicle, the first distance determined by the first radar transceiver operating in a first mode, receive a second determined distance between a second radar transceiver and the vehicle, the second distance determined by the second radar transceiver operating in the first mode, receive a first determined distance ellipse between the first radar transceiver and the vehicle, the first distance ellipse determined by the first radar transceiver operating in a second mode, receive a second determined distance ellipse between the second radar transceiver and the vehicle, the second distance ellipse determined by the second radar transceiver operating in the second mode, and determine at least one location estimate of the vehicle based on the first and second determined distances and first and second determined distance ellipses.

Radar vehicle tracking in accordance with one or more embodiments of the present disclosure can include coordinating a plurality of radar transceivers in order to determine a location of one or more vehicles. The location can be on a roadway, highway, intersection, runway, apron, etc. Embodiments of the present disclosure are not limited to particular types of locations.

Vehicles, as referred to herein, can include mobile machines such as motor vehicles (e.g., cars, trucks, motorcycles buses, trains, watercraft, aircraft, etc.) bicycles, and others. Embodiments of the present disclosure can be implemented as (or as a part of) a vehicle and/or traffic management system.

Embodiments of the present disclosure can alternate the plurality of radar transceivers from a first mode (e.g., monostatic) to a second mode (e.g., multistatic). The alternation may be carried out at a particular frequency in some embodiments.

Such alternation can allow embodiments of the present disclosure to address issues associated with "ghosting" seen in prior approaches. Discussed further below, ghosting is a phenomenon that may occur in radar systems especially when multiple objects (e.g., vehicles) are present. In short, because of radar's shortcomings with respect to directionality, false positives (e.g., "ghosts") may be detected and/or displayed to a user. Embodiments of the present disclosure can reduce (e.g., eliminate) the presence of ghosts.

Because the same transceiver(s) can be used in a plurality of modes, embodiments of the present disclosure can reduce the number of transceivers used to determine vehicle location(s). For example, embodiments of the present disclosure utilizing four transceivers operating in two modes can be equivalent to eight transceivers operating in dedicated (e.g., single) modes. Reducing the number of transceivers used can lead to cost savings associated with acquisition, installation, operation, and/or maintenance of the transceivers, among others.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

FIG. 1 illustrates a system 100 for radar vehicle tracking in accordance with one or more embodiments of the present disclosure. As shown in FIG. 1, system 100 includes a radar transceiver 102 in communication (e.g., wired and/or wireless communication) with a computing device 101, and a vehicle 104. In some embodiments, the computing device 101 can be included in (e.g., be a portion of) the radar transceiver 102. That is, the radar transceiver 102 and the computing device 101 can be parts of the same device.

As shown in FIG. 1, the computing device 101 includes a memory 107 and a processor 109 coupled to memory 107. The processor 109 can be a controller (e.g., a micro controller) in some embodiments. Memory 107 can be any type of storage medium that can be accessed by processor 109 to perform various examples of the present disclosure. For example, memory 107 can be a non-transitory computer readable medium having computer readable instructions (e.g., computer program instructions) stored thereon that are executable by processor 109 to provide radar vehicle tracking in accordance with one or more embodiments of the present disclosure.

Memory 107 can be volatile or nonvolatile memory. Memory 107 can also be removable (e.g., portable) memory, or non-removable (e.g., internal) memory. For example, memory 107 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 107 is illustrated as being located in the computing device 101, embodiments of the present disclosure are not so limited. For example, memory 107 can also be located internal to another computing resource (e.g., enabling computer readable instructions to be downloaded over the Internet or another wired or wireless connection).

As previously discussed, the computing device 101 can be and/or include a controller. The controller can include logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

As shown in FIG. 1, the computing device 101 includes a user interface 111. A user of the computing device 101 can interact with mobile device the computing device 101 via the user interface 111. For example, user interface 111 can provide (e.g., display and/or present) information to the user of computing device 101, and/or receive information from (e.g., input by) the user of computing device 101. For instance, in some embodiments, user interface 111 can be a graphical user interface (GUI) that can include a display (e.g., a screen) that can provide and/or receive information to and/or from the user of computing device 101. The display can be, for instance, a touch-screen (e.g., the GUI can include touch-screen capabilities). As an additional example, user interface 111 can include a keyboard and/or mouse the user can use to input information into computing device 101. Embodiments of the present disclosure, however, are not limited to a particular type(s) of user interface.

The radar transceiver 102 (radar transceivers may be hereafter referred to as "transceivers") can emit (e.g., send) an electromagnetic wave 106. The wave 106 can reflect off of the vehicle 104 and return to the transceiver 102 as a reflected wave 108.

The transceiver 102 can determine a distance between the transceiver 102 and the vehicle 104. For instance, if the wave 106 is sent at time $t_1$ and the reflected wave 108 is received at $t_2$, the computing device 101 can determine the time delay $t=t_2-t_1$. Because the speed of the waves 106 and 108 are constant ($c_0$) the distance (L) between the transceiver 102 and the vehicle 104 can be determined: $L=0.5 c_0 t$. Thus, the transceiver 102 illustrated in FIG. 1 can be said to be operating in a monostatic mode (sometimes referred to herein as a "first mode").

Figure 2:
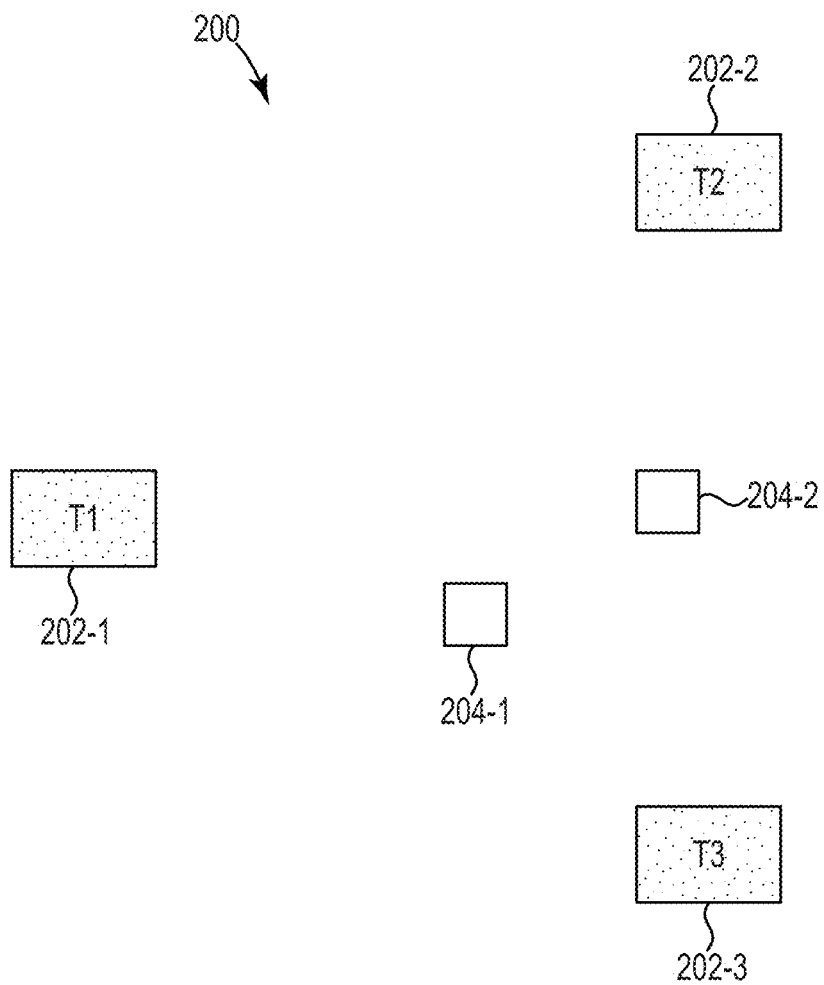
FIG. 2 illustrates another system for radar vehicle tracking in accordance with one or more embodiments of the present disclosure.

FIG. 2 illustrates another system 200 for radar vehicle tracking in accordance with one or more embodiments of the present disclosure. As shown in FIG. 2, system 200 includes a plurality of transceivers: a first transceiver 202-1, a second transceiver 202-2, and a third transceiver 202-3 (sometimes cumulatively referred to herein as "transceivers 202"), a first vehicle 204-1, and a second vehicle 204-2 (sometimes cumulatively referred to herein as "vehicles 204"). The particular quantities and/or locations of transceivers and vehicles depicted in the Figures herein is used for illustrative purposes; embodiments of the present disclosure are not limited to the quantities and/or locations shown.

Though not illustrated for purposes of clarity, system 200 can include one or more computing devices analogous to the computing device 101, previously described in connection with FIG. 1, for instance. In some embodiments, the transceivers 202 can be wired and/or wirelessly connected to a single computing device which can coordinate one or more operations (or modes) of the transceivers 202. Such a computing device may be referred to as a "coordinator." Further, though three transceivers are shown, embodiments of the present disclosure are not limited to a particular number of transceivers.

Each of the transceivers 202 can be located at a particular, respective location. For the purposes of illustration and discussion, the transceivers 202 (and their corresponding locations) can be considered to be analogous with respect to FIGS. 2, 3, and 5, discussed herein. Similarly, one or more of the vehicles 204 can be considered analogous to one or more of the vehicles discussed in FIGS. 2, 3, and 5.

Figure 3:
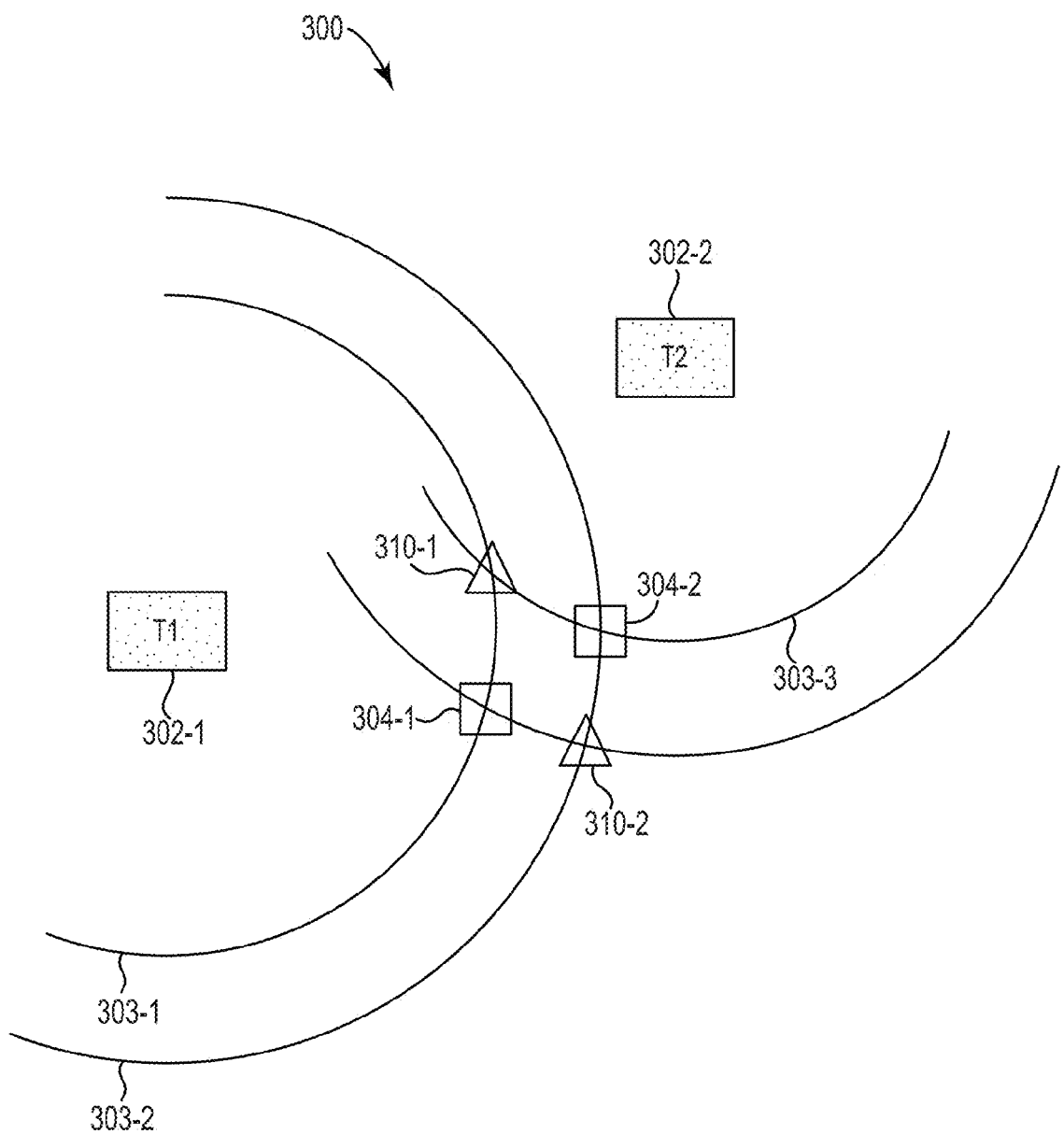
FIG. 3 illustrates another system for radar vehicle tracking in accordance with one or more embodiments of the present disclosure.

FIG. 3 illustrates another system 300 for radar vehicle tracking in accordance with one or more embodiments of the present disclosure. As shown in FIG. 3, system 300 includes the first transceiver 302-1, the second transceiver 302-2, and the vehicles 304. It is noted that the third transceiver, illustrated in FIGS. 2 and 5, has been omitted from FIG. 3 for purposes of clarity.

The transceivers 302 illustrated in FIG. 3 are operating in monostatic mode. Thus, a respective distance between each of the transceivers 302 and each of the vehicles 304 can be determined. Accordingly, the first transceiver 302-1 (e.g., the first transceiver 302-1 and/or a computing device) can determine a first distance 303-1 between the first transceiver 302-1 and the first vehicle 304-1, and can determine a second distance 303-2 between the first transceiver 302-1 and the second vehicle 304-2.

The second transceiver 302-2 can determine a third distance 303-3 between the second transceiver 302-2 and the second vehicle 304-2; and can determine a fourth distance 303-4 between the second transceiver 302-2 and the first vehicle 304-1. The distances 303-1, 303-2, 303-3, and 303-4 may be cumulatively referred to herein as "distances 303."

In monostatic mode, the transceivers 302 can determine the distances 303, but may be unable to determine directionality (e.g., bearing information). Thus, each of the distances 303 is illustrated as a respective circle (or portion of a circle) having a radius defining the distance from its associated transceiver to one of the vehicles 304 (e.g., a location estimate of one of the vehicles 304). These circles can be considered to indicate possible locations of the vehicles 304 as the vehicles 304 can be determined to be a particular distance from each transceiver 302 but not a particular direction from each transceiver 302.

Using two or more of the transceivers 302, embodiments of the present disclosure can reduce the possible locations of the vehicles 304. For instance, when using multiple transceivers, the target object (e.g., either of the vehicles 304) should be located where two or more of the distances 303 (e.g., the circles) intersect. For instance, the first vehicle 304-1 is located at an intersection between the first distance 303-1 and the fourth distance 303-4; and the second vehicle is located at an intersection between the second distance 303-2 and the third distance 303-3.

However, the distances 303 intersect not only at the respective location of the vehicles 304, but at other locations, too. The intersections of two or more of the distances 300 where no vehicle exists may be location estimates (e.g., false location estimates) and may be referred to as "ghosts."

For instance, the intersection of the first distance 303-1 and the third distance 303-3 can indicate a first ghost 310-1; the intersection of the second distance 303-2 and the fourth distance 303-4 can indicate a second ghost 310-2 (sometimes cumulatively referred to herein as "ghosts 310"). The ghosts 310 may appear as vehicles on a display (e.g., the user interface 111, previously described in connection with FIG. 1). That is, their display may be similar to the display of one or more of the vehicles 304 (e.g., a blip on a radar screen).

Figure 4:
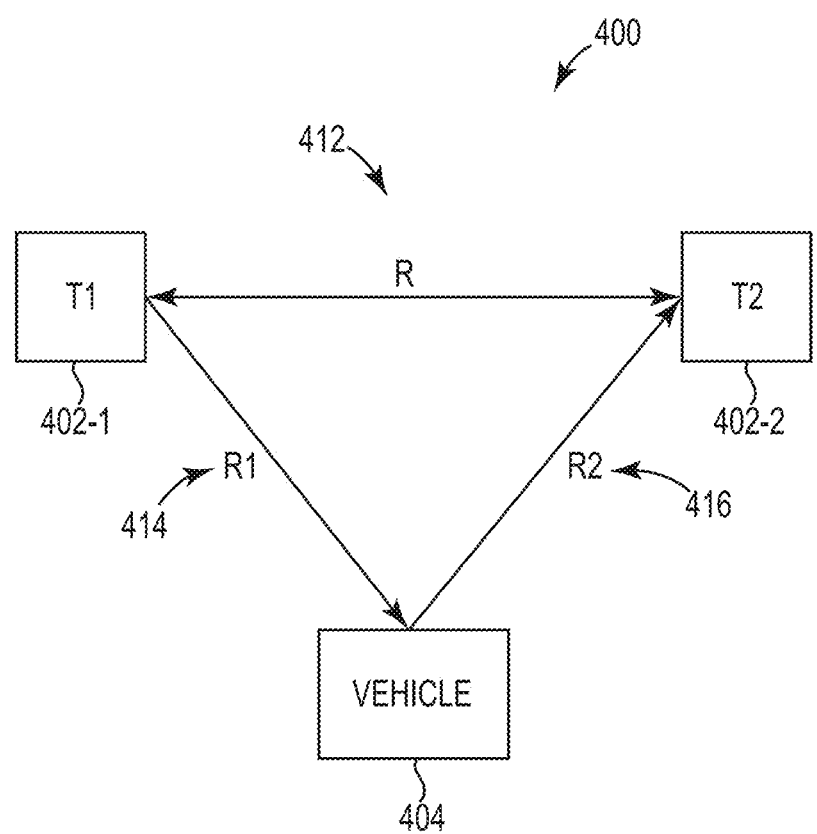
FIG. 4 illustrates another system for radar vehicle tracking in accordance with one or more embodiments of the present disclosure.

FIG. 4 illustrates another system 400 for radar vehicle tracking in accordance with one or more embodiments of the present disclosure. As shown in FIG. 4, the system 400 includes a first transceiver 402-1, a second transceiver 402-2, and a vehicle 404. The system 400 is operating in a multistatic mode (sometimes referred to herein as a "second mode"). To do so, the first transceiver 402-1 is operating as a transmitter (e.g., transmitting and not receiving) and the second transceiver is operating as a receiver (e.g., receiving and not transmitting).

The first transceiver and the second transceiver are separated by a known distance 412 (R). The second transceiver 402-2 receives a signal (e.g., wave(s)) sent from the first transceiver 402-1 through the direct path defined by the known distance R 412 at time $t_1$. Additionally, the second transceiver 402-1 receives a multipath signal (e.g., wave(s)) reflected off of the vehicle 404 at time $t_2$. The multipath signal can be composed of two parts: a first leg 414 ($R_1$) before the multipath signal reflects off of the vehicle 404 and a second leg 416 ($R_2$) after the multipath signal reflects off of the vehicle 404.

The time difference between when the second transceiver 402-2 receives the direct path signal and when the second transceiver 402-2 receives the multipath signal, $\Delta t = t_2 - t_1$, can allow the determination of the distance difference between the direct path and the multipath: $\Delta L = c_0 \Delta t$. Therefore, the length of the multipath can be determined using $L = R + \Delta L$, R being the sum of the first leg 414 and second leg 416 of the multipath. That is, R can be defined as the sum of the distance ($R_1$) between the first transceiver 402-1 and the vehicle 414, and the distance ($R_2$) between the vehicle 404 and the second transceiver 402-2.

Figure 5:
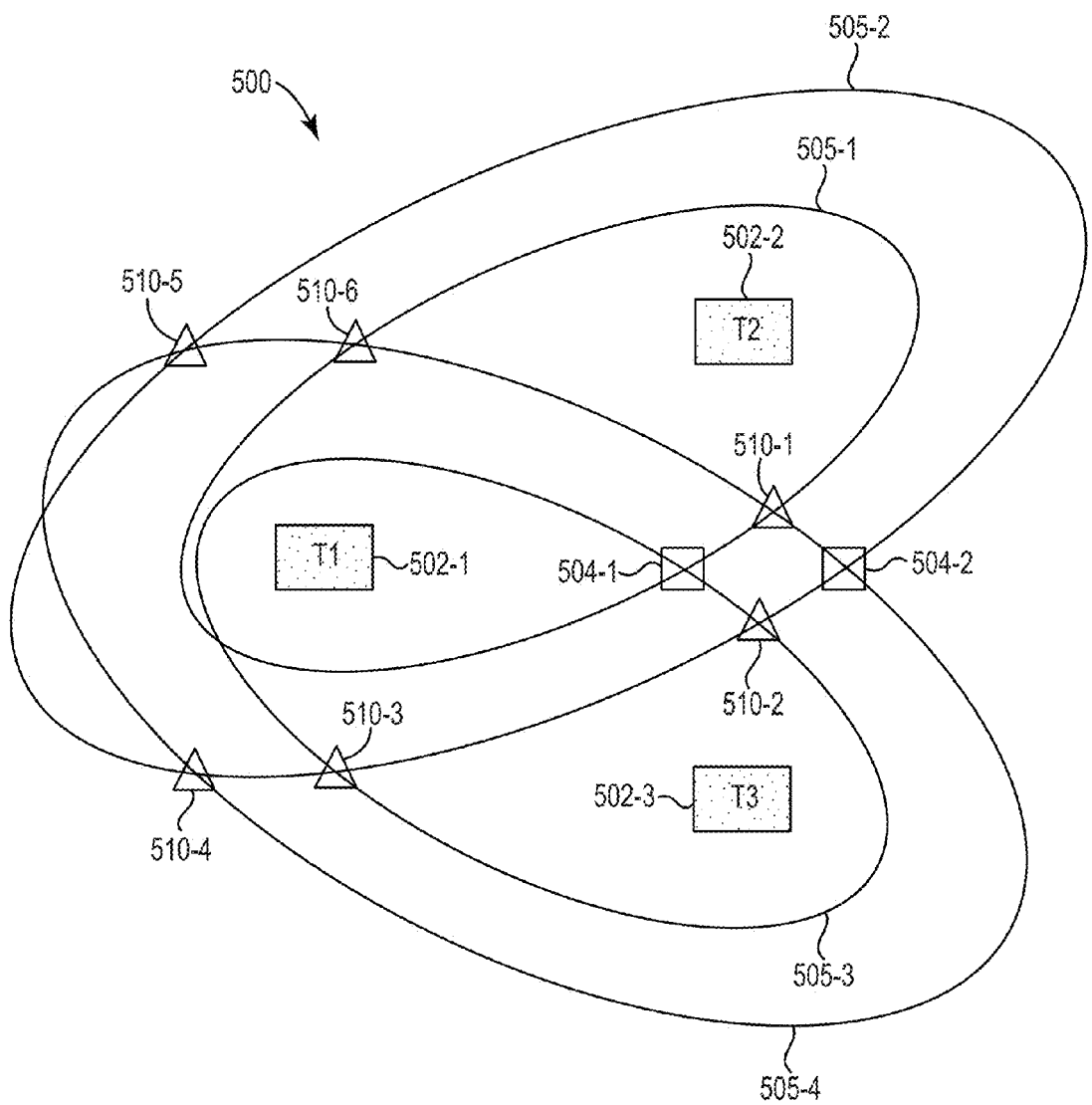
FIG. 5 illustrates another system for radar vehicle tracking in accordance with one or more embodiments of the present disclosure.

FIG. 5 illustrates another system 500 for radar vehicle tracking in accordance with one or more embodiments of the present disclosure. As shown in FIG. 5, system 500 includes the first transceiver 502-1, the second transceiver 502-2, the third transceiver 502-3, the first vehicle 504-1 and the second vehicle 504-2.

The transceivers 502 illustrated in FIG. 5 are operating in multistatic mode. In this example, the first transceiver 502-1 is transmitting while the second transceiver 502-2 and the third transceiver 502-3 are receiving. In other examples, transceiver(s) set to transmit and transceiver(s) set to receive can be different than that illustrated in FIG. 5. That is, operations of transceivers in either monostatic or multistatic mode can be controlled, modified, and/or alternated by a coordinator (e.g., a computing device analogous to the computing device 101, previously described in connection with FIG. 1).

In contrast to the distances (e.g., circles) illustrated in FIG. 3, the multistatic system illustrated in FIG. 5 yields distance ellipses. As shown, a first distance ellipse 505-1 and a second distance ellipse 505-2 can be determined via the first transceiver 502-1 and the second transceiver 502-2. A third distance ellipse 505-3 and a fourth distance ellipse 505-4 can be determined via the first transceiver 502-1 and the third transceiver 502-3). The first distance ellipse 505-1 and the third distance ellipse 505-3, as shown, intersect at the location of the first vehicle 504-1. The second distance ellipse 505-2 and the fourth distance ellipse 505-4, as shown, intersect at the location of the second vehicle 504-2.

However, as with the system 300 illustrated in FIG. 3, the multistatic mode system 500 can cause one or more ghosts to be determined and/or displayed. For instance, as shown, a first ghost 510-1 is located at an intersection of the first distance ellipse 505-1 and the fourth distance ellipse 505-4. A second ghost 510-2 is located at an intersection of the second distance ellipse 505-2 and the third distance ellipse 505-3. A third ghost 510-3 is located at another intersection of the second distance ellipse 505-2 and the third distance ellipse 505-3. A fourth ghost 510-4 is located at an intersection of the second distance ellipse 510-2 and the fourth distance ellipse 510-4. A fifth ghost 510-5 is located at another intersection of the second distance ellipse 510-2 and the fourth distance ellipse 510-4. A sixth ghost 510-63 is located at another intersection of the first distance ellipse 505-1 and the fourth distance ellipse 505-4.

In some embodiments, monostatic mode(s) and multistatic mode(s) can determine ghosts at different locations. However, the location(s) of vehicles(s) should be similarly determined using both monostatic and multistatic modes. Accordingly, alternating between monostatic mode and multistatic mode may allow the determination of vehicle locations while filtering out ghosts, as ghosts may be determined in only one of the two modes with vehicles being determined in both.

Thus, embodiments of the present disclosure can determine which location of the possible locations at which the vehicle is actually located by alternating between monostatic mode (e.g., the first mode) and multistatic mode (e.g., the second mode). Location estimates of the vehicle that are only detected in one of the first and second modes can be discarded as ghosts and therefore the location(s) of the vehicle(s) can be determined after having removed the ghost(s).

In some embodiments, a location estimate of the vehicle determined using one mode that does not have a threshold correlation with at least one location estimate determined using the other mode can be discarded. In some embodiments, having the threshold correlation can refer to being substantially equivalent, within a particular distance, etc.

Figure 6A:
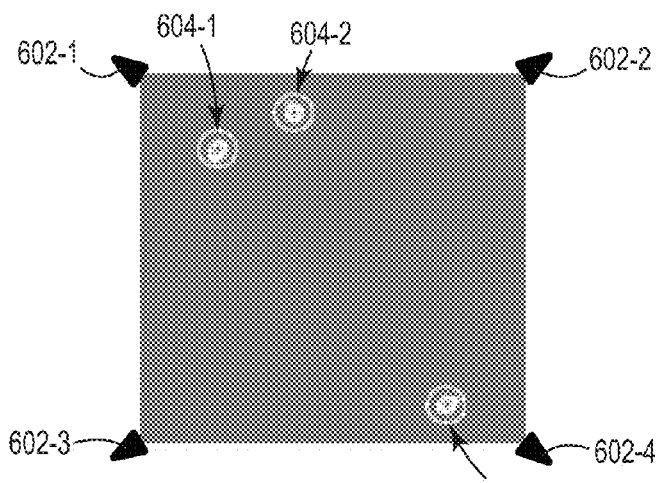
FIG. 6A illustrates an example display including radar-determined locations of a plurality of vehicles using a first mode in accordance with one or more embodiments of the present disclosure.
Figure 6B:
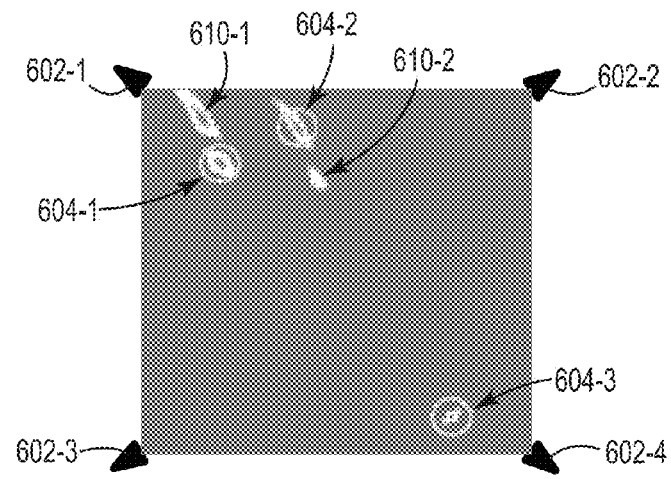
FIG. 6B illustrates an example display including radar-determined locations of the plurality of vehicles using a second mode in accordance with one or more embodiments of the present disclosure.
Figure 6C:
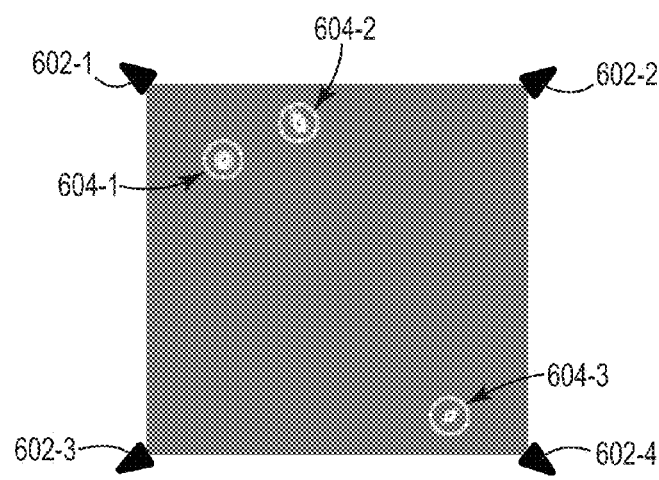
FIG. 6C illustrates an example display including radar-determined locations of the plurality of vehicles using a hybrid mode in accordance with one or more embodiments of the present disclosure.

FIGS. 6A-6C illustrate example displays including radar-determined locations of a plurality of vehicles in accordance with one or more embodiments of the present disclosure. The example displays can be screenshots, for instance, which may be taken from a user interface (e.g., the user interface 111, previously described in connection with FIG. 1).

FIG. 6A illustrates an example display including radar-determined locations of a plurality of vehicles using a first mode (e.g., monostatic) in accordance with one or more embodiments of the present disclosure. The display illustrated in FIG. 6A can be determined using a first transceiver 602-1, a second transceiver 602-2, a third transceiver 602-3, and a fourth transceiver 602-4 (cumulatively referred to as "transceivers 612." As shown, three possible vehicles (and their corresponding location estimates) have been determined by the transceivers 602: a first vehicle 604-1, a second vehicle 604-2, and a third vehicle 604-3.

FIG. 6B illustrates an example display including radar-determined locations of the plurality of vehicles using a second mode (e.g., multistatic) in accordance with one or more embodiments of the present disclosure. The display illustrated in FIG. 6B can be determined using the transceivers 602. For example, under the second (e.g., multistatic) mode, the first transceiver 602-1 can operate as a transmitter, and the second transceiver 602-2, the third transceiver 602-3, and the fourth transceiver 602-4 can operate as receivers. As shown, three possible vehicles have been determined by the transceivers 602: the first vehicle 604-1, the second vehicle 604-2, and the third vehicle 604-3. Additionally, two other vehicle location estimates (e.g., ghosts) have been determined by the transceivers 602: a ghost 610-1 and a ghost 610-2.

FIG. 6C illustrates an example display including radar-determined locations of the plurality of vehicles using a hybrid mode in accordance with one or more embodiments of the present disclosure. The hybrid mode, as referred to herein, can include a combination (e.g., alternation) of the first and second modes. As previously discussed, alternating between the first mode and the second mode can allow embodiments of the present disclosure to remove and/or filter out ghosts (e.g., false positives). The filtering can include using one or more Kalman filtering techniques. Accordingly, the ghosts 610 visible under the second mode illustrated in FIG. 6B have been removed in FIG. 6C leaving only the first vehicle 604-1, the second vehicle 604-2, and the third vehicle 604-3.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A device for radar vehicle tracking, comprising:
   a memory; and
   a processor configured to execute executable instructions stored on the memory to:
   receive a first determined distance between a first radar transceiver and a vehicle, the first distance determined by the first radar transceiver operating in a first mode;
   receive a second determined distance between a second radar transceiver and the vehicle, the second distance determined by the second radar transceiver operating in the first mode;
   receive a first determined distance ellipse between the first radar transceiver and the vehicle, the first distance ellipse determined by the first radar transceiver operating in a second mode;
   receive a second determined distance ellipse between the second radar transceiver and the vehicle, the second distance ellipse determined by the second radar transceiver operating in the second mode;
   determine a first location estimate and a second location estimate based on the first determined distance and the second determined distance; and
   determine a third location estimate and a fourth location estimate based on the first determined distance ellipse and the second determined distance ellipse.

2. The device of claim 1, wherein the first mode is a monostatic mode.

3. The device of claim 1, wherein the second mode is a multistatic mode.

4. The device of claim 1, wherein the instructions are executable to discard one of the first and second location estimates if a correlation between the one of the first and second location estimates and one of the third and fourth location estimates does not exceed a particular threshold.

5. The device of claim 1, wherein the instructions are executable to discard one of the third and fourth location estimates if a correlation between the one of the third and fourth location estimates and one of the first and second location estimates does not exceed a particular threshold.

6. The device of claim 1, wherein operating in the second mode includes transmitting or receiving.

7. A method for radar vehicle tracking, comprising:
   determining a first plurality of possible locations for each of a plurality of vehicles using a plurality of radar transceivers operating via a first mode;
   determining a second plurality of possible locations for each of the plurality of vehicles using the plurality of radar transceivers operating via a second mode;
   alternating the plurality of radar transceivers between the first mode and the second mode; and determining a location for each of the plurality of vehicles by removing any of the first plurality of possible locations not substantially equivalent to at least one of the second plurality of possible locations and removing any of the second plurality of possible locations not substantially equivalent to at least one of the first plurality of possible locations.

8. The method of claim 7, wherein a possible location being substantially equivalent to another possible location includes the possible location having a threshold correlation with the other possible location.

9. The method of claim 8, wherein having the threshold correlation includes the possible location being within a particular distance from the other possible location.

10. The method of claim 7, wherein the method includes alternating the plurality of radar transceivers between the first mode and the second mode at a particular frequency.

11. The method of claim 7, wherein the plurality of radar transceivers is four radar transceivers.

12. The method of claim 7, wherein determining which of the first plurality of possible locations is not substantially equivalent to at least one of the second plurality of possible locations and determining which of the second plurality of possible locations is not substantially equivalent to at least one of the first plurality of possible locations includes using at least one Kalman filtering technique.

13. A system for radar vehicle tracking, comprising:
a first radar transceiver configured to determine a first distance between the first radar transceiver and a first vehicle and a second distance between the first radar transceiver and a second vehicle via a first mode;
a second radar transceiver configured to determine a third distance between the second radar transceiver and the first vehicle and a fourth distance between the second radar transceiver and the second vehicle via the first mode;
a third radar transceiver configured to determine a fifth distance between the third radar transceiver and the first vehicle and a sixth distance between the third radar transceiver and the second vehicle via the first mode; and
a fourth radar transceiver configured to determine a seventh distance between the fourth radar transceiver and the first vehicle and an eighth distance between the fourth radar transceiver and the second vehicle via the first mode; and
a coordinator configured to:
receive the first, second, third, fourth, fifth, sixth, seventh, and eighth determined distances;
determine a first plurality of location estimates of the first and second vehicles based on the first, second, third, fourth, fifth, sixth, seventh, and eighth determined distances; and
cause the first, second, third, and fourth radar transceivers to switch to a second mode.

14. The system of claim 13, wherein:
the first radar transceiver is configured to determine a first distance ellipse between the first radar transceiver and the first vehicle and a second distance ellipse between the first radar transceiver and the second vehicle via the second mode;
the second radar transceiver is configured to determine a third distance ellipse between the second radar transceiver and the first vehicle and a fourth distance ellipse between the second radar transceiver and the second vehicle via the second mode;
the third radar transceiver is configured to determine a fifth distance ellipse between the third radar transceiver and the first vehicle and a sixth distance ellipse between the third radar transceiver and the second vehicle via the second mode; and
the fourth radar transceiver is configured to determine a seventh distance ellipse between the fourth radar transceiver and the first vehicle and an eighth distance ellipse between the fourth radar transceiver and the second vehicle via the second mode; and
the coordinator is configured to:
receive the first, second, third, fourth, fifth, sixth, seventh, and eighth determined distance ellipses; and
determine a second plurality of location estimates of the first and second vehicles based on the first, second, third, fourth, fifth, sixth, seventh, and eighth determined distance ellipses.

15. The system of claim 14, wherein the coordinator is configured to remove a particular location estimate of at least one of the first and second vehicles from the first plurality of location estimates if the particular location estimate is not included in the second plurality of location estimates.

16. The system of claim 15, wherein the coordinator is configured to determine a location of at least one of the first and second vehicles based on the first plurality of location estimates and the second plurality of location estimates having removed the particular location estimate from the first plurality of location estimates.

17. The system of claim 14, wherein the coordinator is configured to remove a particular location estimate of at least one of the first and second vehicles from the second plurality of location estimates if the particular location estimate is not included in the first plurality of location estimates.

18. The system of claim 17, wherein the coordinator is configured to determine a location of the at least one of the first and second vehicles based on the first plurality of location estimates and the second plurality of location estimates having removed the particular location estimate from the second plurality of location estimates.

* * * * *